UNITED STATES PATENT OFFICE.

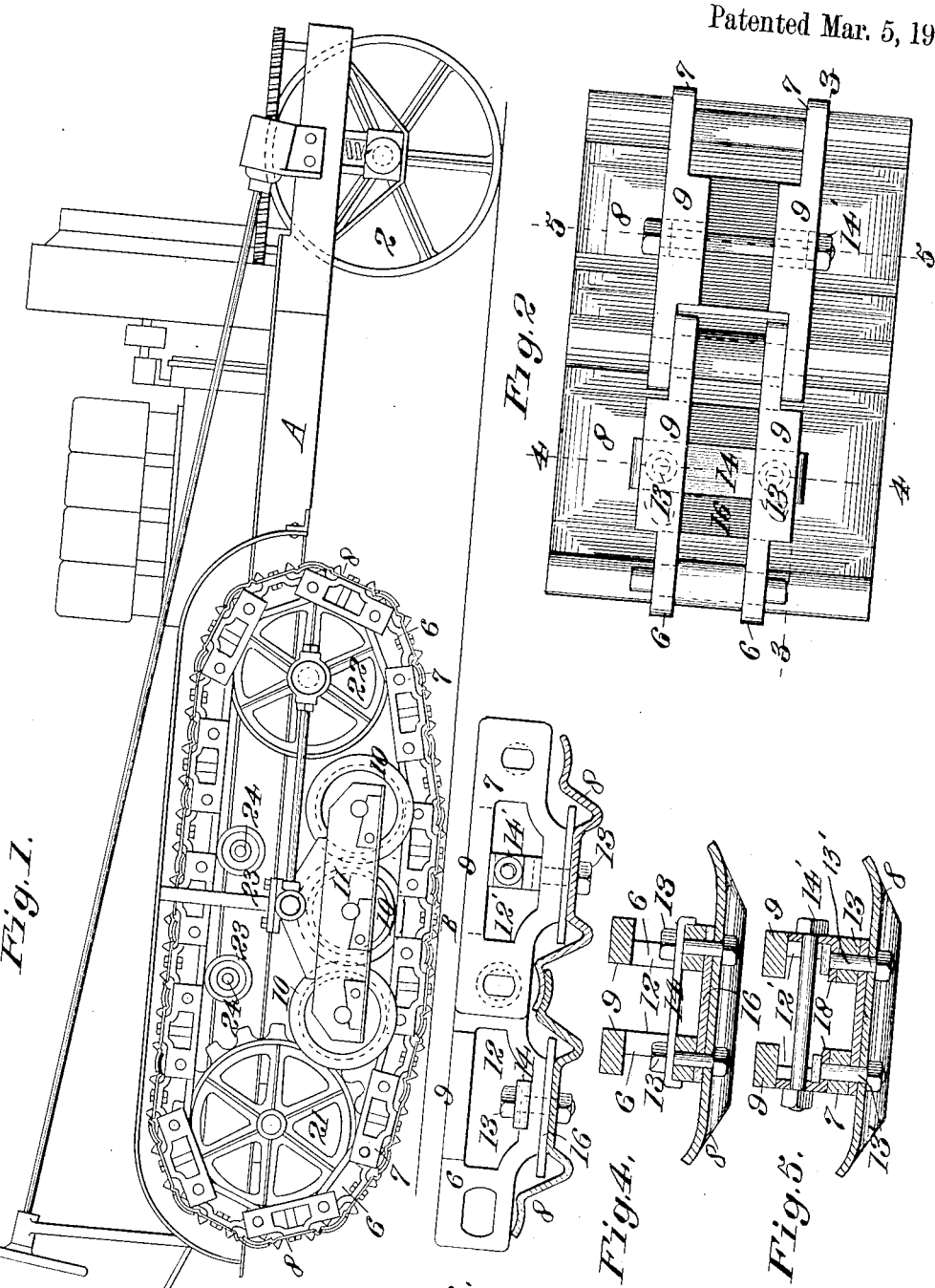

BENJAMIN HOLT, OF STOCKTON, CALIFORNIA, ASSIGNOR TO THE HOLT MANUFACTURING COMPANY, OF STOCKTON, CALIFORNIA.

TRACTION-ENGINE.

1,258,604.　　　　Specification of Letters Patent.　　Patented Mar. 5, 1918.

Original application filed August 2, 1915, Serial No. 43,073. Divided and this application filed March 7, 1916. Serial No. 82,691.

*To all whom it may concern:*

Be it known that I, BENJAMIN HOLT, a citizen of the United States, residing at Stockton, in the county of San Joaquin and State of California, have invented new and useful Improvements in Traction-Engines, of which the following is a specification.

This invention relates to traction engines and pertains especially to traction engines and other vehicles of the self-laying track variety.

The particular object of the present invention is to provide a strong, rigid, non-collapsible track link and shoe for use in the self-laying track.

Having reference to the accompanying drawings:

Figure 1 is a side-elevation of the machine.

Fig. 2 is a plan view of two links coupled together.

Fig. 3 is a vertical, longitudinal section on line 3—3, Fig. 2.

Fig. 4 is a vertical cross-section on line 4—4, Fig. 2.

Fig. 5 is a vertical cross-section on line 5—5, Fig. 2.

A is the main frame of the tractor, preferably constructed of longitudinal channel iron sills, suitably cross braced to form a rigid structure. The front end of the frame is spring supported on a steering wheel 2 controlled from the driver's seat 3 at the rear by the tiller wheel 4 and appropriate steering connections; the rear end of the frame being supported upon a pair of endless, flexible self-laying tracks B of special construction. Each of these tracks is composed of articulated inside and outside respective link sections 6—7, carrying removable overlapping track shoes 8. Each link is made in two complementary parallel parts having rail heads 9 on their inner edges forming continuous rails on which the truck wheels 10 mounted in rocking trucks 11 are adapted to run. The inside link sections 6 are made with open spaces 12 in which spaces are accommodated the bolt heads of the bolts 13 which unite the track shoes 8 to the links; the two companion parts of each link being connected across by a tie bar 14 through which the bolts 13 pass. The tie bars 14 have their ends slightly bent over the outside of the links so as to add rigidity to the link structure. The links and track shoes are further reinforced by the underneath plates 16, which latter are disposed between the shoes and links. The outside links 7 have openings 12' corresponding to the openings 12 in the inside links 6, and the track shoes are held in place by bolts 13 similarly as in the first instance, but instead of using the tie bars 14 as described, there is employed the tie bolts 14' in conjunction with the angle braces 18 inserted in the spaces 12' and serving as a buttress to support the arch or rail head portion of the link; the bolts 13' passing up through the angle supports 18 as shown in Fig. 5.

The foregoing construction of link allows a comparatively light link to be used and still to possess the requisite strength and stiffness.

The endless tracks B are adapted to pass around respective rear drive sprockets 21 and front idlers 22; the upper run of the belts being supported on idle rollers 23 carried on brackets 24, which are secured to the main frame A.

While I have particularly shown the invention as applicable to a traction engine, it is obvious that it is adapted to vehicles generally of the self-laying track variety, whether tractors or trailer wagons.

This application is a division of my original application, Serial No. 43073, series of 1915, filed August 2, 1915.

Having thus described the invention, what is claimed and desired to secure by Letters Patent is—

1. An endless chain track for tractors, comprising a series of articulated link sections, each link section, embodying a side plate adapted to constitute a rail and having a side opening, a track shoe, and a bolt lying in the plane of said side opening and passing through the side plate and the shoe to secure the shoe to the side plate.

2. An endless chain track for tractors, comprising a series of articulated link sections, each link section embodying a pair of spaced side plates respectively adapted to constitute rails and having side openings, a track shoe, bolts lying in the plane of said side openings and each bolt passing through a side plate and the shoe to secure the shoe to the side plates and transverse bracing means connecting the side plates.

3. An endless chain track for tractors comprising a series of articulated link sections, each link section embodying a pair of spaced side plates respectively adapted to constitute rails and having side openings, a track shoe, bolts lying in the plane of said side openings and each bolt passing through a side plate and the shoe to secure the shoe to the side plates, and a transverse bracing member extending through the openings in the side plates.

4. A link for an endless chain track of the character set forth, comprising a pair of spaced side plates respectively adapted to constitute rails and having side openings, a track shoe, bolts lying in the plane of said side openings and each bolt passing through a side plate and the shoe to secure the shoe to the side plates, and a tie bar extending transversely through the openings in the side plates and secured in position by said bolts.

5. A link for an endless chain track of the character set forth, comprising a pair of spaced side plates respectively adapted to constitute rails and having side openings, a track shoe, bolts lying in the plane of said side openings and each bolt passing through a side plate and the shoe to secure the shoe to the side plates, and a tie bar extending transversely through the openings in the side plates and having its ends overlapping the outer faces of the side plates, said tie bar being secured in position by said bolts.

6. A link for an endless chain track comprising apertured side plates forming rails, removable bracing means secured in said apertures to support the upper portion of the plates, and means disposed in the plane of said plates to secure the plates on a shoe.

7. A link for an endless chain track of the character set forth, comprising a pair of spaced side plates respectively adapted to constitute rails and having side openings, vertical bracing members lying in the plane of and bridging the spaces in the respective side openings, a track shoe, bolts lying in the plane of said side openings and connecting the vertical bracing members, side plates and shoe together, and a transverse bracing member connecting said vertical bracing members.

8. A link for an endless chain track of the character set forth, comprising a side plate adapted to constitute a rail and having a side opening, a vertical bracing member lying in the plane of and bridging the space in the side opening, a track shoe, and a bolt lying in the plane of said side opening and connecting the vertical bracing member, side plate and shoe together.

9. A link for an endless chain track of the character set forth, comprising a side plate adapted to constitute a rail and having a side opening, a track shoe, and a bolt lying in the plane of said side opening and passing through the side plate and shoe to secure the side plate and shoe together.

10. A link for an endless chain track of the charater set forth, comprising a pair of spaced side plates respectively adapted to constitute rails and having side openings, a track shoe, bolts lying in the plane of said side openings and each bolt passing through a side plate and the shoe to secure the shoe to the side plates, and transverse bracing means connecting the side plates.

In testimony whereof I have hereunto set my hand in the presence of two subscribing witnesses.

BENJAMIN HOLT.

Witnesses:
R. E. MANN,
F. W. TARR.